United States Patent
Fujita et al.

(10) Patent No.: US 11,312,363 B2
(45) Date of Patent: Apr. 26, 2022

(54) CONTROL METHOD AND CONTROL APPARATUS OF HYBRID VEHICLE

(71) Applicant: Nissan Motor Co., Ltd., Yokohama (JP)

(72) Inventors: Yuki Fujita, Kanagawa (JP); Takeo Aizawa, Kanagawa (JP); Kazuki Iijima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 21 days.

(21) Appl. No.: 16/771,336

(22) PCT Filed: Dec. 15, 2017

(86) PCT No.: PCT/JP2017/045170
§ 371 (c)(1),
(2) Date: Jun. 10, 2020

(87) PCT Pub. No.: WO2019/116556
PCT Pub. Date: Jun. 20, 2019

(65) Prior Publication Data
US 2020/0391722 A1    Dec. 17, 2020

(51) Int. Cl.
*B60W 20/15* (2016.01)
*B60W 10/06* (2006.01)
(Continued)

(52) U.S. Cl.
CPC .......... *B60W 20/15* (2016.01); *B60W 10/06* (2013.01); *B60W 10/08* (2013.01); *F02D 41/045* (2013.01);
(Continued)

(58) Field of Classification Search
CPC ...... B60W 20/15; B60W 10/06; B60W 10/08; B60W 2510/0638; B60W 2540/10;
(Continued)

(56) References Cited

U.S. PATENT DOCUMENTS 5,070,832 A   12/1991   Hapka et al.
5,788,597 A    8/1998   Boll et al.
(Continued)

FOREIGN PATENT DOCUMENTS

EP    3150829 A1   4/2017
JP    2010-111321 A   5/2010
(Continued)

*Primary Examiner* — Yi-Kai Wang
(74) *Attorney, Agent, or Firm* — Young Basile Hanlon & MacFarlane, P.C.

(57) ABSTRACT

It is a control method of a hybrid vehicle that includes an engine and an electrical power generation motor that is connected with the engine for controlling a rotational speed of the engine to be a target rotational speed. When an failure with respect to the engine is judged, an upper limit of a target rotational speed of a firing operation is set to a first upper limit rotational speed lower than an upper limit for a normal state. Further, a target rotational speed of a motoring operation is set to be not higher than the first upper limit rotational speed. It becomes possible to carry out transition between the firing operation and the motoring operation quickly.

8 Claims, 6 Drawing Sheets

(51) Int. Cl.
  *B60W 10/08* (2006.01)
  *F02D 41/04* (2006.01)
  *F02D 41/22* (2006.01)

(52) U.S. Cl.
  CPC ..... *F02D 41/22* (2013.01); *B60W 2510/0638* (2013.01); *B60W 2540/10* (2013.01); *F02D 2200/101* (2013.01)

(58) Field of Classification Search
  CPC ... B60W 2710/0644; B60W 2710/081; B60W 20/50; B60W 2510/081; F02D 41/045; F02D 41/22; F02D 2200/101; F02D 10/70; Y02T 10/62; B60K 6/46; B60Y 2200/92
  USPC .......................................................... 701/22
  See application file for complete search history.

(56) References Cited

U.S. PATENT DOCUMENTS

| | | | |
|---|---|---|---|
| 2010/0121512 A1 | 5/2010 | Takahashi et al. | |
| 2014/0277995 A1 | 9/2014 | Slaton et al. | |
| 2015/0166042 A1* | 6/2015 | Kitahata | B60W 30/188 |
| | | | 477/3 |
| 2016/0229391 A1* | 8/2016 | Shigemoto | B60L 15/2054 |
| 2019/0118800 A1* | 4/2019 | Cho | B60K 6/26 |

FOREIGN PATENT DOCUMENTS

| | | | |
|---|---|---|---|
| WO | 2015179482 A1 | 11/2015 | |
| WO | 2016024053 A1 | 2/2016 | |

\* cited by examiner

FIG. 3A  ENGINE FAILURE JUDGEMENT

FIG. 3B  ENGINE ROTATIONAL SPEED

FIG. 3C  NUMBER OF F/C CYLINDERS

FIG. 4A  ENGINE FAILURE JUDGEMENT

FIG. 4B  ENGINE ROTATIONAL SPEED

FIG. 4C  NUMBER OF F/C CYLINDERS

FIG. 6A   ENGINE FAILURE JUDGEMENT

FIG. 6B   ENGINE ROTATIONAL SPEED

FIG. 6C   NUMBER OF F/C CYLINDERS

CONTROL METHOD AND CONTROL APPARATUS OF HYBRID VEHICLE

TECHNICAL FIELD

The present invention relates to a control apparatus of a hybrid vehicle and a control method of a hybrid vehicle.

BACKGROUND

For example, Japanese Patent Application Publication No. 2010-111321 discloses that, when a device relating to an engine (internal combustion engine), such as a coolant temperature sensor, of a hybrid vehicle fails, a drastic change of a rotational speed of the engine in a high vehicle speed state is restricted by shifting it into a motoring operation to prevent an occurrence of a secondary failure.

SUMMARY

However, since an upper limit rotational speed is not set when shifting into the motoring operation from a firing operation in the prior-art example disclosed in the Japanese Patent Application Publication No. 2010-111321, there is a problem that transition between the firing operation and the motoring operation is not done quickly and thereby acceleration responsiveness degrades.

The present invention is made in order to solve such a prior-art problem, and its object is to provide a control method of a hybrid vehicle and a control apparatus of a hybrid vehicle that can carry out transition between a firing operation and a motoring operation quickly.

An aspect of the present invention sets an upper limit of a target rotational speed for a firing operation to an on-failure upper limit rotational speed when a failure is judged with respect to an internal combustion engine. In addition, a target rotational speed for a motoring operation is set to be not higher than the on-failure upper limit rotational speed.

According to the aspect of the present invention, it becomes possible to carry out transition between the firing operation and the motoring operation quickly even when a failure is judged with respect to the internal combustion engine.

DETAILED DESCRIPTION

Hereinafter, an embodiment of the present invention will be explained with reference to the drawings.

Explanations of Configuration of the Present Embodiment

Figure 1:
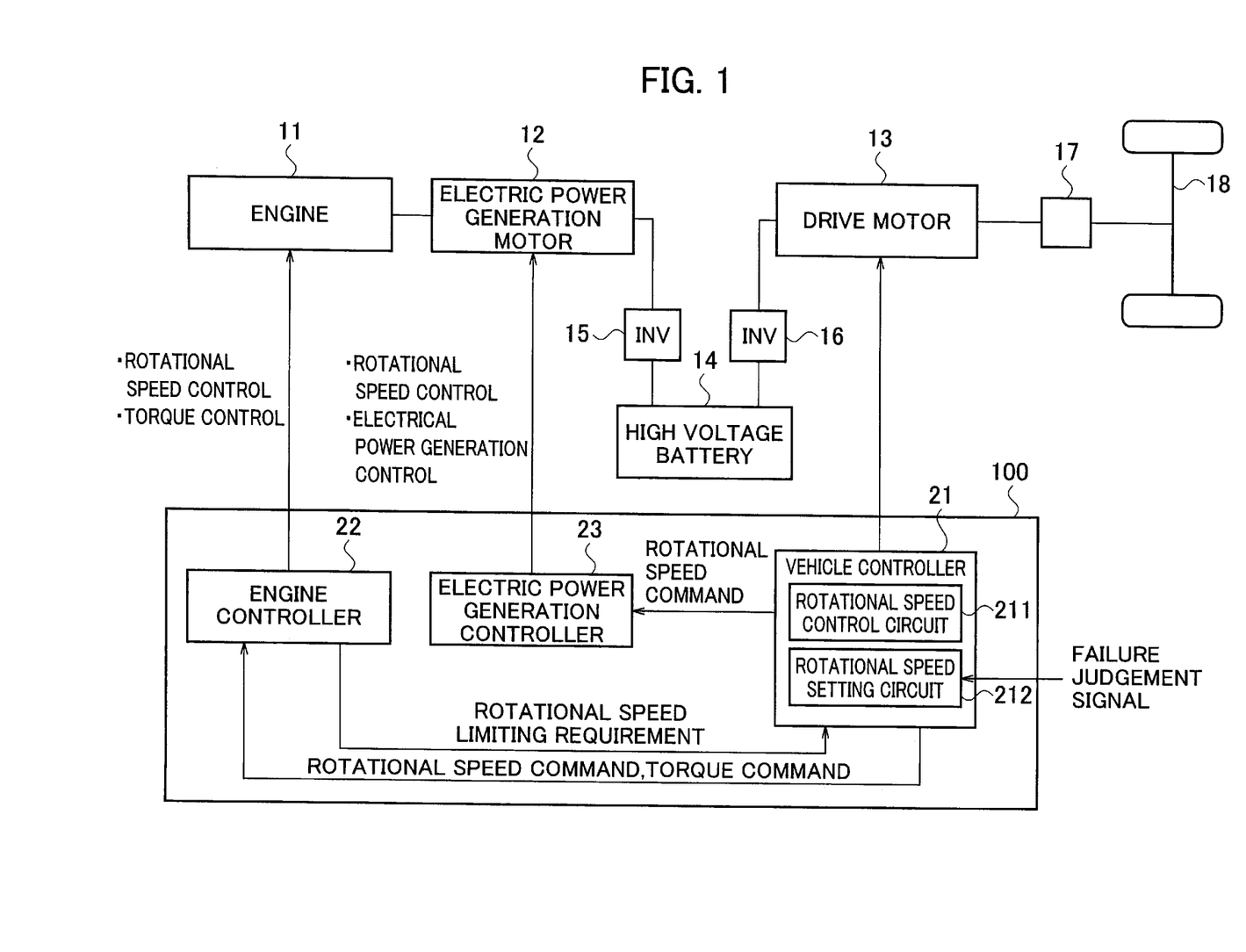
FIG. 1 is a block diagram showing configuration of a control apparatus of a hybrid vehicle according to an embodiment of the present invention.

FIG. 1 is a block diagram showing schematic configuration of a series-type hybrid vehicle that serves as an example of a hybrid vehicle. As shown in FIG. 1, a powertrain of the series-type hybrid vehicle includes an engine 11 (an internal combustion engine), an electrical power generation motor 12 (an electrical power generating motor), a drive motor 13 (a driving motor), a high voltage battery 14, an inverter 15 for the electrical power generation motor, an inverter 16 for the drive motor, and a speed reduction mechanism 17.

In addition, although not shown in the drawings, the series-type hybrid vehicle shown in the present embodiment has a single pedal, and is a so-called one-pedal type vehicle in which a so-called one-pedal control, in which acceleration is made by pushing this pedal and deceleration is made by releasing the pedal, is carried out. In the one-pedal type vehicle, it is possible to run the vehicle only by on and off of the pedal. Of course, the present invention is not limited to a one-pedal type vehicle.

The series-type hybrid vehicle runs the vehicle by operating the engine 11 in a firing operation or a motoring operation. The firing operation is an operation for charging the high voltage battery 14 by supplying fuel to the engine 11 and combusting it to rotate the electrical power generation motor 12. The motoring operation is an operation for reducing an SOC (state of charge) of the high voltage battery 14 by rotating the engine 11 by use of the electrical power generation motor 12 with no combustion in the engine 11.

The engine 11 is started by a drive force of the electrical power generation motor 12 connected with an output shaft of the engine 11 when an electrical power generation request signal is input, and then driven to rotate while fuel is supplied thereto. When the electrical power generation request signal transitions to an electrical power generation stop signal, its rotation is stopped.

The electrical power generation motor 12, whose rotor is jointed with the engine 11, generates alternating-current electrical power while the rotor rotates due to rotations of the engine 11.

The drive motor 13, which is jointed with drive wheels 18 of the vehicle via the speed reduction mechanism 17, drives the vehicle during start acceleration, constant speed running and intermediate acceleration, and generates regenerative electrical power during deceleration.

The high voltage battery 14 stores the electrical power generated by the electrical power generation motor 12 and the regenerative electrical power generated by the drive motor 13. In addition, it supplies electrical power to the drive motor 13. At the start-up of the engine 11, it supplies electrical power required for the start-up to the electrical power generation motor 12.

The inverter 15 for the electrical power generation motor is disposed between the electrical power generation motor 12 and the high voltage battery 14, and converts the alternating current electrical power generated by the electrical power generation motor 12 to direct current electrical power to charge the high voltage battery 14.

The inverter 16 for the drive motor is disposed between the drive motor 13 and the high voltage battery 14, and converts the direct current electrical power output from the high voltage battery 14 to three-phase alternating current electrical power to supply it to the drive motor 13.

In addition, a control system of the series-type hybrid vehicle shown in FIG. 1 includes a control apparatus 100 that controls a rotational speed of the engine 11 and a rotational speed of the drive motor 13. The control apparatus 100 includes a vehicle controller 21, an engine controller 22 and an electrical power generation controller 23. Note that the control apparatus 100 shown in FIG. 1 shows only its featured configurations according to the present invention, and functions other than them are omitted.

Note that the vehicle controller 21, the engine controller 22 and the electrical power generation controller 23 that configure the control apparatus 100 are feasible by using a micro-computer provided with a CPU (central processing unit), a memory and an input/output unit. A computer program for functioning the micro-computer as the vehicle controller 21, the engine controller 22 and the electrical power generation controller 23 is installed in the micro-computer and then executed. According to this, the micro-computer functions as plural information processing circuits included in the vehicle controller 21, the engine controller 22 and the electrical power generation controller 23. Note that an example, in which the vehicle controller 21, the engine controller 22 and the electrical power generation controller 23 are achieved by software, is shown here, but, of course, they may be configured by preparing a specific hardware(s) for executing each information processing. In addition, plural circuits included in the vehicle controller 21, the engine controller 22 and the electrical power generation controller 23 may be configured by individual hardware.

The vehicle controller 21 includes a rotational speed control circuit 211 and a rotational speed setting circuit 212. The rotational speed control circuit 211 outputs a rotational speed command signal and a torque command signal to the engine controller 22 so that the rotational speed and the output torque of the engine 11 (internal combustion engine) becomes a preset target rotational speed and a preset target output torque. Further, it outputs a rotational speed command signal so that the rotational speed of the electrical power generation motor 12 becomes a preset target rotational speed.

The rotational speed setting circuit 212 retrieves a failure judgement signal of a device relating to the engine 11. For example, when the failure judgement signal is output from an ECU (Electronic Control Unit: not shown in the drawings) installed in the vehicle at a failure occurrence, where a coolant temperature sensor that measures a temperature of coolant fails or where overheating occurs for example, it retrieves this failure judgement signal. When the failure judgement signal occurs, it sets a rotational speed for stopping fuel supply to the engine 11, i.e. an F/C rotational speed that is a rotational speed for carrying out fuel cut. Further, it sets a rotational speed for restarting fuel supply after the fuel cut, i.e. an F/C recovery rotational speed that is a rotational speed for stopping the fuel cut. The F/C rotational speed is 2000 to 2500 rpm (hereinafter, it is denoted as "R1 rpm") for example, and the F/C recovery rotational speed is 1800 to 2300 rpm (hereinafter, it is denoted as "R2 rpm") for example. Here, R1>R2. Therefore, the fuel cut is done when the failure judgement signal is input and the engine rotational speed once increases up to R1 rpm, and then the fuel cut is continued until the engine rotational speed decreases to R2 rpm.

Furthermore, the rotational speed setting circuit 212 sets an upper limit of a target rotational speed of the firing operation of the engine 11 (an on-failure upper limit rotational speed) when the failure judgement signal is input. Hereinafter, this is called as a "first upper limit rotational speed". Furthermore, it sets a target rotational speed of the motoring operation to a second upper limit rotational speed that is not higher than the first upper limit rotational speed. For example, the first upper limit rotational speed is set to a rotational speed slightly lower than the above-mentioned F/C recovery rotational speed. For example, it is set to 1750 to 2250 rpm (hereinafter, it is denoted as "R3 rpm"). Here, R2>R3. Namely, the first upper limit rotational speed is set to a rotational speed lower than an upper limit when the failure judgement signal is not input (a normal state). In addition, the second upper limit rotational speed is set to be not higher than the first upper limit rotational speed. In the present embodiment, an example in which the first upper limit rotational speed and the second upper limit rotational speed are set identically to R3 rpm will be explained as one example. Then, it outputs the set target rotational speeds to the engine controller 22 and the electrical power generation controller 23.

The engine controller 22 controls the rotational speed of the engine 11 when the engine 11 is operated under the firing operation so as to make it become the target rotational speed of the firing operation output from the vehicle controller 21. In addition, at the failure occurrence where the coolant temperature sensor that is a device relating to the engine 11 fails or where overheating occurs (when the failure judgement signal is input), it outputs the rotational speed command signal to the engine 11 such that the rotational speed of the engine 11 becomes not higher than R3 rpm that is the above-mentioned first upper limit rotational speed. Namely, at the failure occurrence, an occurrence of a secondary failure is prevented by decreasing the rotational speed of the engine 11.

While the engine 11 is operated under the motoring operation, the electrical power generation controller 23 controls driving of the electrical power generation motor 12 based on the rotational speed set by the rotational speed command output from the vehicle controller 21. In addition, when the failure judgement signal is input, it controls the rotational speed of the electrical power generation motor 12 so as to make it become not higher than R3 rpm that is the second upper limit rotational speed set by the vehicle controller 21.

Explanations of Operations of the Present Embodiment

Figure 2:
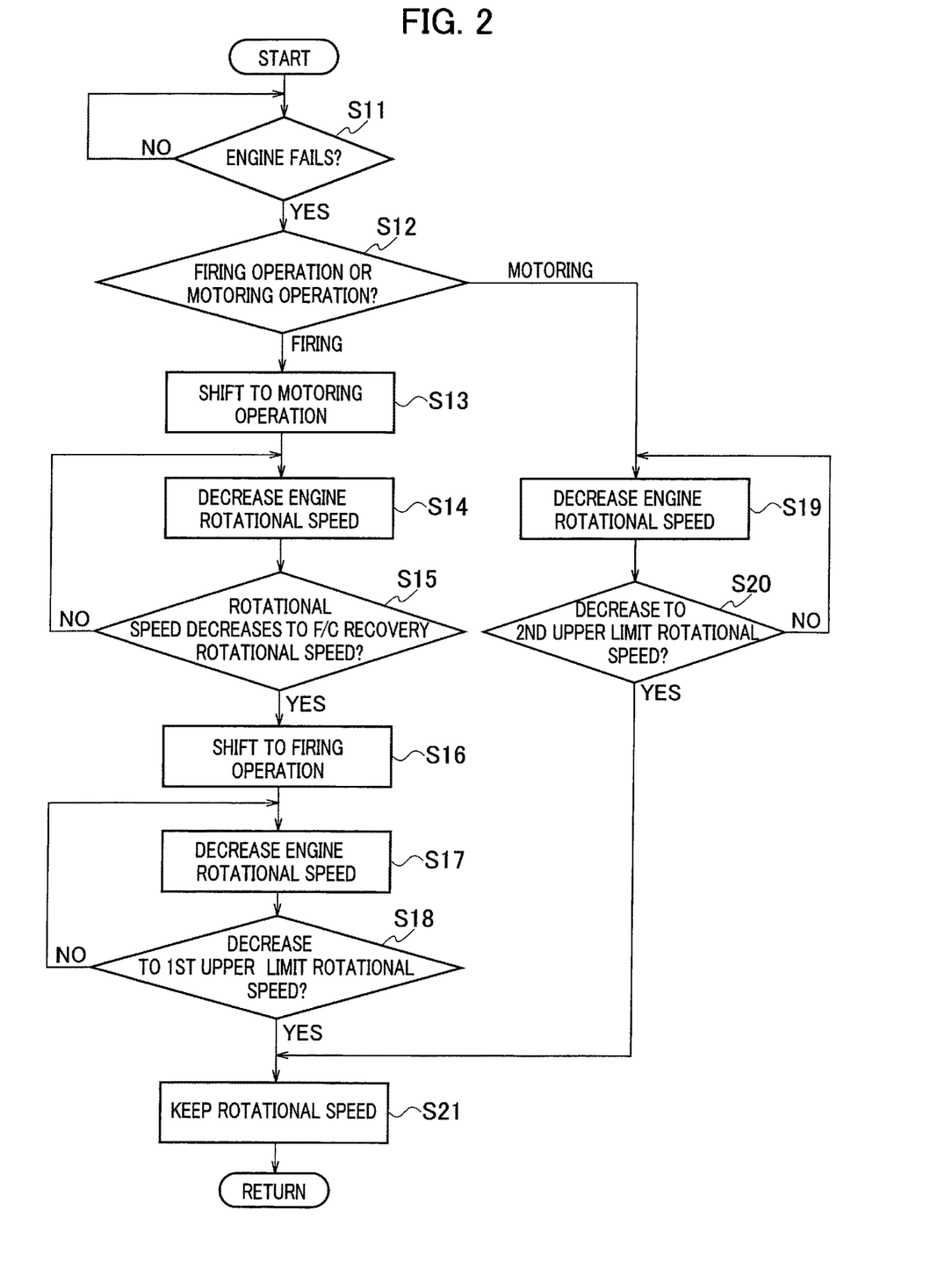
FIG. 2 is a flowchart showing operation processes of the control apparatus of a hybrid vehicle according to the embodiment of the present invention.
Figure 3A:
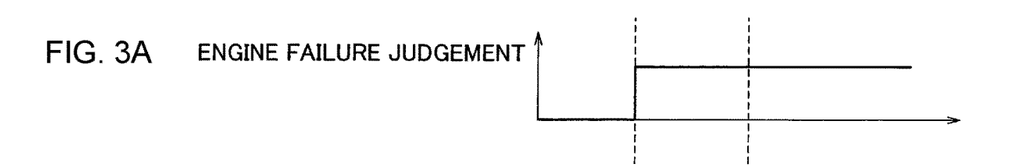
FIGS. 3A-3C are timing charts showing changes of a rotational speed of an engine and the number of F/C cylinders in a case where a failure occurs while the engine is operated in a firing operation.
Figure 3B:
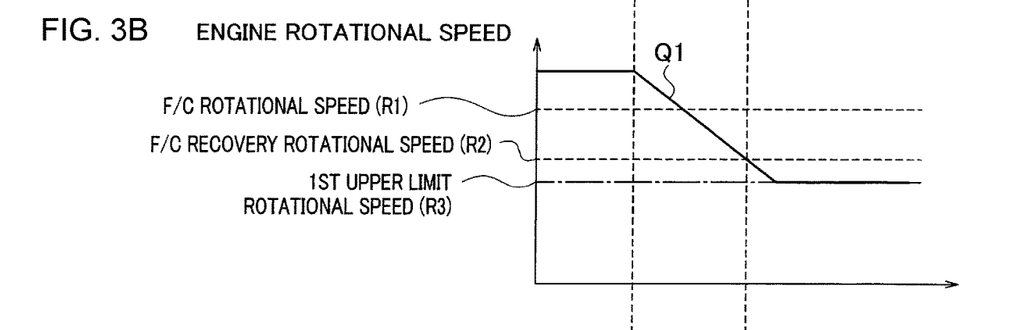
Figure 3C:
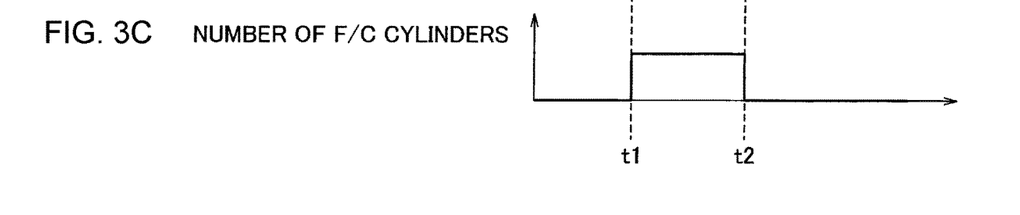
Figure 4A:
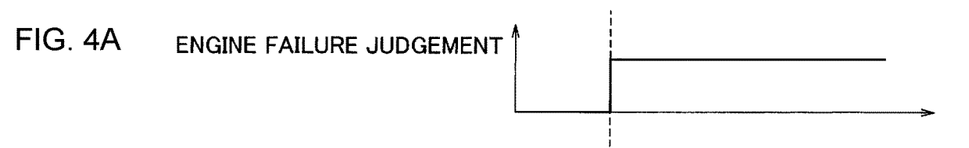
FIGS. 4A-4C are timing charts showing changes of a rotational speed of an engine and the number of F/C cylinders in a case where a failure occurs while the engine is operated in a motoring operation.
Figure 4B:
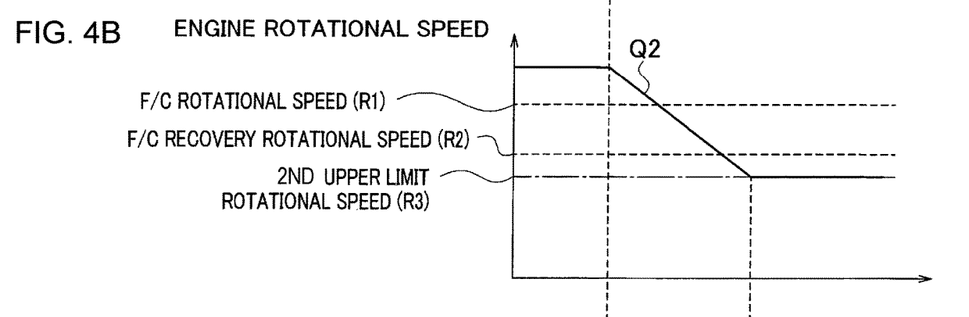
Figure 4C:
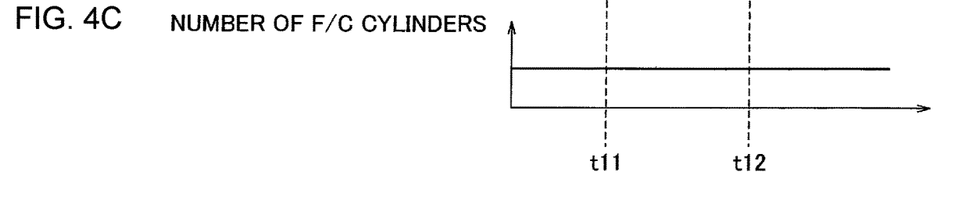

Next, operation processes of the control apparatus 100 of the hybrid vehicle according to the present embodiment that is configured as described above will be explained with reference to a flowchart shown in FIG. 2, and FIGS. 3A-3C and FIGS. 4A-4C. FIGS. 3A-3C are timing charts of operations when a failure occurs during the firing operation, and FIGS. 4A-4C are timing charts of operations when a failure occurs during the motoring operation.

The engine 11 is initially driven at a high rotational speed (e.g. 4000 to 5000 rpm) by the firing operation or the motoring operation. In a step S11, the vehicle controller 21 judges whether or not the failure judgement signal is input. For example, the failure judgement signal is input when the coolant temperature sensor fails or overheating occurs.

When the failure judgement signal is input, the vehicle controller 21 judges whether or not a state of the engine 11 is the firing operation or the motoring operation in a step S12.

In a case of the firing operation, the process flow proceeds to a step S13. Hereinafter, operations of the firing operation shown by steps S13 to S18 will be explained with reference to the timing chart shown in FIGS. 3A-3C. When the failure judgement signal is input at a time t1 as shown in FIG. 3A, the vehicle controller 21 carries out fuel cut of the engine 11 (stop supplying fuel). The fuel cut is done for all cylinders as shown in FIG. 3C, and thereby the engine 11 is shifted to the motoring operation.

In a step S14, the vehicle controller 21 decreases the rotational speed of the engine 11 under the motoring operation at an almost constant decrease rate (gradient). Namely, in a case where the failure judgement signal is input while the engine 11 rotates at a higher rotational speed than the first upper limit rotational speed (R3 rpm) and a state before the failure judgement is the firing operation, it is shifted to the motoring operation. Further, the engine rotational speed under the motoring operation is decreased.

The engine rotational speed gradually decreases from the time t1 as shown by a sign Q1 in FIG. 3B, and then reaches the F/C recovery rotational speed (e.g. R2 rpm) at a time t2. By making the decrease rate of the rotational speed almost constant (monotonically decreasing), noise occurrence and noise fluctuation can be prevented and it can be avoided to provide a feeling of strangeness to a passenger of the vehicle.

In a step S15, it is judged whether or not the rotational speed of the engine 11 decreases to R2 rpm that is the F/C recovery rotational speed. Since the engine rotational speed decreases to R2 rpm at the time t2 shown in FIGS. 3A-3C, the vehicle controller 21 shifts the engine 11 from the motoring operation to the firing operation in a step S16.

The vehicle controller 21 decreases the rotational speed of the engine 11 again in a step S17, and judges whether or not it decreases to the first upper limit rotational speed (R3 rpm) that is an upper limit rotational speed during a failure in the firing operation in a step S18. When it decreases thereto, this rotational speed is kept in a step S21.

By setting the first upper limit rotational speed to R3 rpm slightly lower than R2 rpm that is the F/C recovery rotational speed, the engine rotational speed surely becomes lower than the F/C recovery rotational speed, even if the engine rotational speed slightly fluctuates. Therefore, the fuel cut is stopped and then the number of the F/C cylinders becomes zero. According to this, transition between the firing operation and the motoring operation can be done quickly.

On the other hand, in a case where the engine 11 is in the motoring operation when the failure judgement signal is input ("motoring" in the step S12), the process flow proceeds to a step S19. Hereinafter, the motoring operation shown in the steps S19 and S20 will be explained with reference to the timing chart shown in FIGS. 4A-4C.

In the step S19, the vehicle controller 21 decreases the rotational speed of the engine 11. Namely, in a case where a failure is judged while the engine 11 rotates at a higher rotational speed than the first upper limit rotational speed and a state before the failure judgement is the motoring operation, the motoring operation is maintained and the rotational speed is limited to the second upper limit rotational speed set not higher than the first upper limit rotational speed by monotonically decreasing it.

By explaining this with reference to FIGS. 4A-4C, the failure judgement signal is input at a time t11 and then the engine rotational speed under the motoring operation decreases at an almost constant decrease rate (gradient). Therefore, the engine rotational speed gradually decreases as shown by a sign Q2 in FIG. 4B. The decrease ratio at this time is equivalent to the decrease rate shown in FIG. 3B. Namely, the decrease rate for monotonically decreasing the rotational speed is made equivalent when a state before the failure judgement is the motoring operation and when that is the firing operation.

In a step S20, it is judged whether or not to decrease to the second upper limit rotational speed (R3 rpm) that is an upper limit rotational speed during a failure in the motoring operation. When it is judged that the rotational speed Q2 decreases to R3 rpm as shown by a time t12 in FIGS. 4A-4C, a control for keeping this rotational speed is done in the step S21. In this manner, the rotational speed control upon an input of the failure judgement signal while the engine 11 is driven at a high rotational speed is done.

Figure 5:
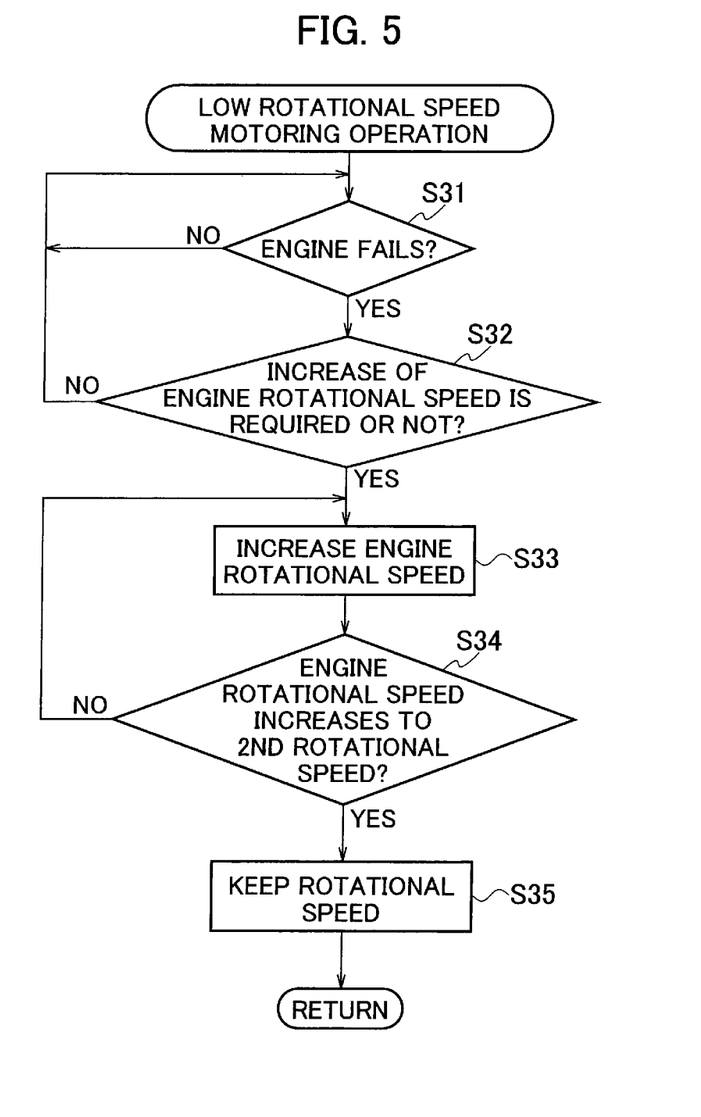
FIG. 5 is a flowchart showing operation processes in a case where a failure occurs while a rotational speed of the engine is low.
Figure 6A:
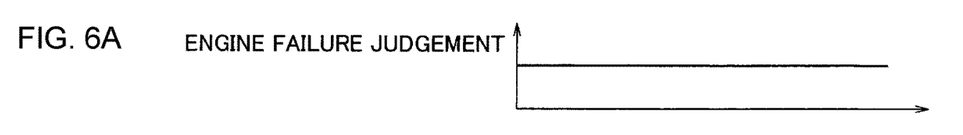
FIGS. 6A-6C are timing charts showing changes of a rotational speed of an engine and the number of F/C cylinders in a case where a failure occurs while a rotational speed of the engine is low.

Next, operation processes upon a failure occurrence while the engine 11 rotates at a low rotational speed under the motoring operation will be explained with reference to a flowchart shown in FIG. 5, and FIGS. 6A-6C. The FIGS. 6A-6C are timing charts showing operations when a failure occurs a low rotational speed under the motoring operation.

Figure 6B:
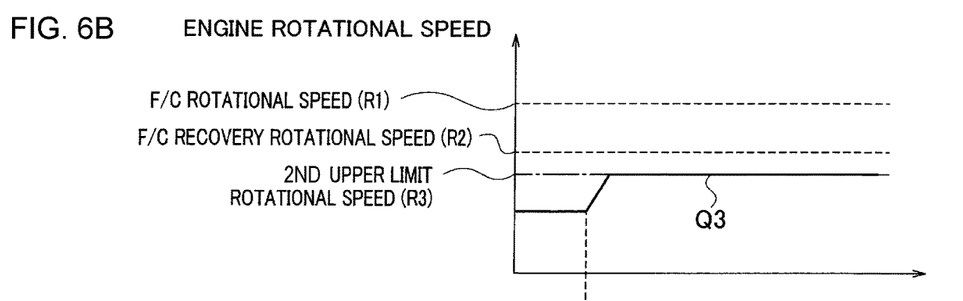
Figure 6C:
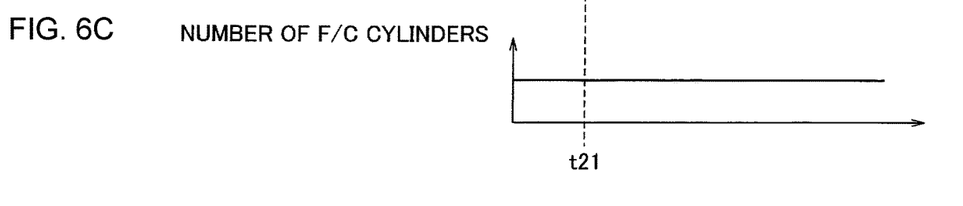

The engine 11 is initially operated under the motoring operation at a lower rotational speed than R3 rpm as shown in FIG. 6B. Because of the motoring operation, the number of the F/C cylinders is set to its maximum as shown in FIG. 6C. Namely, fuel is not supplied to the engine 11. In a step S31, the vehicle controller 21 judges whether or not the failure judgement signal is input.

When the failure judgement signal is input as shown in FIG. 6A, the vehicle controller 21 judges whether or not increase request of the engine rotational speed is generated in a step S32. For example, Electrical power generated due to rotations of the electrical power generation motor 12 cannot be charged to the high voltage battery 14 in a case where an accelerator opening of the vehicle increases while the SOC of the high voltage battery 14 takes an almost upper limit value. Therefore, the generated electrical power is consumed by rotating of the engine 11. According to this, it is required to increase the rotational speed of the engine 11, and thereby the YES judgement is made in the step S32 (see a time t21 in FIGS. 6A-6C). In a step S33, the vehicle controller 21 outputs an increase command of the engine rotational speed to the engine controller 22. The engine controller 22 increases the rotational speed of the engine 11 at a constant increase rate (gradient) as shown by a sign Q3 in FIG. 6B.

In a step S34, the vehicle controller 21 judges whether or not the rotational speed of the engine 11 reaches R3 rpm that is the second upper limit rotational speed. When it reaches R3 rpm, a control for keeping this rotational speed is done in a step S35.

In this manner, in a case where the request for increasing the rotational speed of the engine 11 is generated while the engine 11 is operated at a low rotational speed under the motoring operation, it increases up to R3 rpm that is the second upper limit rotational speed at a constant increase rate and then this rotational speed is kept. Therefore, the rotational speed of the engine 11 in the motoring operation can be prevented from increasing largely, and thereby quick transition can be achieved when shifting to the firing operation.

Note that the example in which the first upper limit rotational speed is set to R3 rpm that is lower than R2 rpm that is the F/C recovery rotational speed is explained in the above embodiment, but it can be set not higher than R1 rpm that is the F/C rotational speed.

As explained above, following advantages can be brought in the control apparatus of a hybrid vehicle according to the present embodiment.

(1) It is difficult to transition quickly between the two operation states in a case where no upper limit rotational speed at a failure occurrence is set or a case where an upper limit rotational speed for the firing operation is largely different from that for the motoring operation. Therefore, accelerating and decelerating responsiveness degrade and thereby a passenger feels strangeness. In the present embodiment, in a case where the failure judgement signal is input while the engine 11 is operated under both the firing operation and the motoring operation, the engine rotational speed is limited quickly to the first upper limit rotational speed that is an upper limit rotational speed in the firing operation or the second upper limit rotational speed that is an upper limit rotational speed in the motoring operation. Therefore, transition from the firing operation to the motoring operation or transition from the motoring operation to the firing operation can be carried out quickly, and thereby responsiveness can be improved.

(2) In a case where the failure judgement signal is input while the engine 11 rotates at a higher rotational speed (e.g. 4000 to 5000 rpm) than an on-failure upper limit rotational speed (the first upper limit rotational speed) under the firing operation, it is shifted to the motoring operation and then its rotational speed is decreased to the first upper limit rotational speed (R3 rpm) slightly lower than the F/C recovery rotational speed.

In order to decrease the rotational speed quickly while maintaining the firing operation, electrical power generation is needed. However, the electrical power generation motor 12 cannot generate electrical power when the SOC of the high voltage battery 14 is high. In the present embodiment, even when the SOC of the high voltage battery 14 is high, it is possible to decrease the engine rotational speed quickly by transitioning to the motoring operation.

(3) In addition, since the rotational speed of the motoring operation is controlled, the decrease rate (gradient) for decreasing the rotational speed can be set to a decrease rate that never provides a feeling of strangeness such as a noise occurrence. Namely, fuel cut is merely done when the failure judgement signal is input and the decrease rate of the rotational speed is not controlled in a prior-art and thereby a problem such as a noise occurrence may occur due to changes of the decrease rate, but such a problem can be prevented in the present embodiment.

(4) In a case where the failure judgement signal is input when the engine 11 is operated under the motoring operation and rotates at the higher rotational speed (e.g. 4000 to 5000 rpm) than the on-failure upper limit rotational speed (the first upper limit rotational speed), the motoring operation is maintained and it is decreased to the second upper limit rotational speed (R3 rpm) slightly lower than the F/C recovery rotational speed.

The fact that a state before the failure judgement signal is input is the motoring operation means that it is a state where the electrical power stored in the high voltage battery 14 is consumed by the electrical power generation motor 12. In such a case, by decreasing the rotational speed at the constant gradient by the rotational speed control, changes of deceleration and changes of noises can be reduced with no rapid change of electrical power consumed by the electrical power generation motor 12. As the result, feelings of strangeness and fearfulness that a passenger feels can be prevented. In addition, after the engine rotational speed has decreased, it becomes possible to carry out the transition between the firing operation and the motoring operation quickly.

(5) By making the decrease rate (gradient) for monotonically decreasing the rotational speed equivalent between a case where a state before the failure judgement signal is input (before a failure is judged) is the motoring and a case where it is the firing operation, decelerations and noises that occur in the vehicle can be made coincident with each other and thereby feelings of strangeness and fearfulness that a passenger feels can be prevented.

(6) By setting the on-failure upper limit rotational speed for the firing operation (the first upper limit rotational speed) to the F/C rotational speed and setting the target rotational speed for the motoring operation (the second upper limit rotational speed) to be not higher than the F/C recovery rotational speed, it becomes possible to transition to the firing operation quickly after the rotational speed has decreased and thereby the responsiveness can be improved.

(7) The hybrid vehicle is a vehicle with the one-pedal control in which acceleration is made by the drive motor 13 when a single pedal is pushed and deceleration is made when the pedal is released. Namely, since the drive source of the vehicle is the drive motor 13 (driving motor) that is driven by electrical power supplied from the high voltage battery 14, and has a function for generating a negative driving force (deceleration) in the vehicle, it is possible to decrease the engine rotational speed to R3 rpm by releasing the pedal when the failure judgement signal is input.

Although the embodiment of the present invention is described as above, it should be understood that descriptions and drawings that are part of this disclosure don't limit the invention. Based on this disclosure, various alternative embodiments, practical examples and operational technologies may be made known for person skilled in the art.

REFERENCE SIGNS LIST 11 engine (internal combustion engine)
12 electrical power generation motor (electrical power generating motor)
13 drive motor (driving motor)
14 high voltage battery
15 inverter for the electrical power generation motor
16 inverter for the drive motor
17 speed reduction mechanism
18 drive wheel
21 vehicle controller
22 engine controller
23 electrical power generation controller
100 control apparatus

The invention claimed is:

1. A control method of a hybrid vehicle that includes an internal combustion engine and an electrical power generating motor that is connected with the internal combustion engine for controlling a rotational speed of the internal combustion engine to be a target rotational speed, the method comprising:

when a failure with respect to the internal combustion engine is judged, setting an upper limit of the target rotational speed of a firing operation of the internal combustion engine during the failure to an on-failure upper limit rotational speed that is lower than an on-failure fuel cut rotational speed that is a rotational speed for stopping fuel supply to the internal combustion engine during the failure; and controlling the target rotational speed of a motoring operation to be not higher than an on-failure fuel cut recovery rotational speed that is a rotational speed for restarting the fuel supply after the fuel cut during the failure.

2. The control method of a hybrid vehicle according to claim 1, further comprising,
when the failure is judged while the internal combustion engine rotates at a higher rotational speed than the on-failure upper limit rotational speed and a state before the failure judgement is the firing operation,
transitioning to the motoring operation; and
decreasing the rotational speed of the internal combustion engine during the motoring operation.

3. The control method of a hybrid vehicle according to claim 2, further comprising
limiting the rotational speed of the internal combustion engine to be not higher than the on-failure upper limit rotational speed by monotonically decreasing the rotational speed.

4. The control method of a hybrid vehicle according to claim 1, further comprising,
when the failure is judged while the internal combustion engine rotates at a higher rotational speed than the on-failure upper limit rotational speed and a state before the failure judgement is the motoring operation,
maintaining the motoring operation; and
limiting the rotational speed of the internal combustion engine to be not higher than the on-failure upper limit rotational speed by monotonically decreasing the rotational speed.

5. The control method of a hybrid vehicle according to claim 3, wherein
a decrease rate for monotonically decreasing the rotational speed in the motoring operation during the failure is equivalent to a decrease rate for monotonically decreasing the rotational speed in the motoring operation during the failure after the failure judgement is made during the motoring operation.

6. The control method of a hybrid vehicle according to claim 1, wherein
a drive source of the hybrid vehicle is a driving motor for driving the hybrid vehicle by electrical power supplied from a high voltage battery, and the hybrid vehicle has a function for making acceleration by pushing a pedal and making deceleration by releasing the pedal.

7. A control apparatus of a hybrid vehicle comprising:
an internal combustion engine;
an electrical power generating motor that is connected with the internal combustion engine;
a rotational speed control circuit that controls a rotational speed of the internal combustion engine to be a target rotational speed; and
a rotational speed setting circuit that, when a failure with respect to the internal combustion engine is judged, sets an upper limit of the target rotational speed of a firing operation of the internal combustion engine during the failure to an on-failure upper limit rotational speed that is not higher than an on-failure fuel cut rotational speed that is a rotational speed for stopping fuel supply to the internal combustion engine during the failure and controls the target rotational speed of a motoring operation of the internal combustion engine during the failure to be not higher than an on-failure fuel cut recovery rotational speed that is a rotational speed for restarting the fuel supply after the fuel cut during the failure.

8. The control method of a hybrid vehicle according to claim 4, wherein
a decrease rate for monotonically decreasing the rotational speed in the motoring operation during the failure is equivalent to a decrease rate for monotonically decreasing the rotational speed in the motoring operation during the failure after the failure judgement is made during the firing operation.

* * * * *